United States Patent
Beggel et al.

(10) Patent No.: US 12,277,696 B2
(45) Date of Patent: Apr. 15, 2025

(54) DATA AUGMENTATION FOR DOMAIN GENERALIZATION

(71) Applicant: Robert Bosch GmbH, Stuttgart (DE)

(72) Inventors: Laura Beggel, Stuttgart (DE); Filipe J. Cabrita Condessa, Pittsburgh, PA (US); Robin Hutmacher, Renningen (DE); Jeremy Kolter, Pittsburgh, PA (US); Nhung Thi Phuong Ngo, Karlsruhe (DE); Fatemeh Sheikholeslami, Pittsburgh, PA (US); Devin T. Willmott, Pittsburgh, PA (US)

(73) Assignee: Robert Bosch GmbH (DE)

( * ) Notice: Subject to any disclaimer, the term of this patent is extended or adjusted under 35 U.S.C. 154(b) by 438 days.

(21) Appl. No.: 17/716,590

(22) Filed: Apr. 8, 2022

(65) Prior Publication Data
US 2023/0326005 A1  Oct. 12, 2023

(51) Int. Cl.
*G06T 7/00* (2017.01)
*G06N 20/00* (2019.01)
(Continued)

(52) U.S. Cl.
CPC .......... *G06T 7/0004* (2013.01); *G06N 20/00* (2019.01); *G06T 7/11* (2017.01); *G06T 7/194* (2017.01);
(Continued)

(58) Field of Classification Search
None
See application file for complete search history.

(56) References Cited

U.S. PATENT DOCUMENTS

| | | | | |
|---|---|---|---|---|
| 2002/0037103 A1* | 3/2002 | Hong | ...................... | G06T 7/194 382/173 |
| 2003/0053692 A1* | 3/2003 | Hong | ........................ | G06T 7/11 375/E7.081 |
| 2014/0226900 A1* | 8/2014 | Saban | .................... | H04N 23/63 382/165 |

(Continued)

OTHER PUBLICATIONS

Fan et al. "Cross-Spectrum Dual-Subspace Pairing for RGB-infrared Cross-Modality Person Re-Identification," arXiv:2003.00213v1 [cs.CV] Feb. 29, 2020 (Year: 2020).*

(Continued)

*Primary Examiner* — Soo Shin
(74) *Attorney, Agent, or Firm* — Dickinson Wright PLLC

(57) ABSTRACT

Methods and systems are disclosed for generating training data for a machine learning model for better performance of the model. A source image is selected from an image database, along with a target image. An image segmenter is utilized with the source image to generate a source image segmentation mask having a foreground region and a background region. The same is performed with the target image to generate a target image segmentation mask having a foreground region and a background region. Foregrounds and backgrounds of the source image and target image are determined based on the masks. The target image foreground is removed from the target image, and the source image foreground is inserted into the target image to create an augmented image having the source image foreground and the target image background. The training data for the machine learning model is updated to include this augmented image.

20 Claims, 11 Drawing Sheets

(51) Int. Cl.
　　　*G06T 7/11*　　　(2017.01)
　　　*G06T 7/194*　　(2017.01)
(52) U.S. Cl.
　　　CPC .............. *G06T 2207/10024* (2013.01); *G06T 2207/20081* (2013.01)

(56) References Cited

U.S. PATENT DOCUMENTS

| | | | | |
|---|---|---|---|---|
| 2017/0294000 | A1* | 10/2017 | Shen | G06F 3/0482 |
| 2018/0330493 | A1* | 11/2018 | Milligan | G06N 3/088 |
| 2019/0047895 | A1* | 2/2019 | Kuhn | G06T 7/0004 |
| 2019/0154474 | A1* | 5/2019 | Kausler | G01D 3/08 |
| 2020/0193609 | A1* | 6/2020 | Dharur | G06T 7/143 |
| 2020/0234451 | A1* | 7/2020 | Holzer | G06T 7/194 |
| 2020/0242788 | A1* | 7/2020 | Jacobs | G06T 7/593 |
| 2021/0142497 | A1* | 5/2021 | Pugh | G06T 7/194 |
| 2022/0101047 | A1* | 3/2022 | Puri | G06T 5/30 |
| 2023/0326005 | A1* | 10/2023 | Beggel | G06N 3/0464 |
| | | | | 382/141 |

OTHER PUBLICATIONS

Cheung et al., "PriorityCut: Occlusion-guided Regularization for Warp-based Image Animation," arXiv:2103.11600v1 [cs.CV] Mar. 22, 2021 (Year: 2021).*

Jeong et al., "Observations on K-image Expansion of Image-Mixing Augmentation for Classification," arXiv:2110.04248v1 [cs.CV] Oct. 8, 2021 (Year: 2021).*

Uddin et al., "Saliencymix: A Saliency Guided Data Augmentation," 1 arXiv:2006.01791v2 [cs.LG] Jul. 27, 2021 (Year: 2021).*

Yun et al., "CutMix: Regularization Strategy to Train Strong Classifiers with Localizable Features," Proceedings of the IEEE/CVF international conference on computer vision. 2019, arXiv:1905.04899v2 [cs.CV] Aug. 7, 2019, 14 Pages.

Yun et al., "CutMix: Regularization Strategy to Train Strong Classifiers with Localizable Features", arXiv:1905.04899v2 [cs.CV] Aug. 7, 2019, 14 Pages.

Wong et al., "Learning Perturbation Sets for Robust Machine Learning", arXiv:2007.08450v2 [cs.LG] Oct. 8, 2020, 32 Pages.

* cited by examiner

DATA AUGMENTATION FOR DOMAIN GENERALIZATION

TECHNICAL FIELD

The present disclosure relates to data augmentation for domain generalization. In embodiments, the present disclosure relates to creating new, augmented images for machine learning applications using image segmentation.

BACKGROUND

Machine learning has achieved remarkable success in various areas, such as computer vision, natural language processing, healthcare, autonomous driving, and others. A goal of machine learning is to design a model that can learn general and predictive knowledge from training data, and then apply the model to new (test) data. Such machine learning models may rely on domain generalization, also known as domain shift or domain regularization.

Domain generalization utilizes a machine learning model intended to solve a task where data may come from a variety of domains. For example, the model may be an object-detection model or image-recognition model that should perform adequately to properly detect the object under various conditions (e.g., backgrounds, lighting, blurriness, interferences, contrasts, etc.). These different conditions constitute the different data domains for the model. Model performance will often vary depending on the domain, and specifically on the amount of data from each domain in the data set used to train the model. The task of domain generalization is to maintain model performance in domains that are underrepresented within the training set, or that are not represented at all (i.e., the trained model has never seen these domains before). In short, domain generalization deals with a challenging setting where one or several different but related domain(s) are given, and the goal is to learn a model that can generalize to an unseen test domain.

SUMMARY

According to an embodiment, a system for performing at least one task with autonomous control of a part comprises an image sensor configured to output an image of the part; an actuator configured to bin the part based on a detected defect in the part; a processor; and memory including instructions that, when executed by the processor, cause the processor to perform the following steps: retrieve a source image stored in the memory; retrieve a target image stored in the memory; utilize an image segmenter with a source image to generate a source image segmentation mask having a foreground region and a background region; utilize the image segmenter with the target image to generate a target image segmentation mask having a foreground region and a background region; determine a source image foreground and a source image background of the source image based on the source image segmentation mask; determine a target image foreground and a target image background of the target image based on the target image segmentation mask; remove the target image foreground from the target image; insert the source image foreground into the target image with the removed target image foreground to create an augmented image having the source image foreground and the target image background; update training data of the machine learning model with the augmented image; utilize the machine learning model with the updated training data to determine a defect in the part; and actuate the actuator to bin the part based on the determined defect in the part.

According to an embodiment, a computer-implemented method for generating training data for a machine learning model comprises: selecting a source image from an image database; selecting a target image from the image database; utilizing an image segmenter with the source image to generate a source image segmentation mask having a foreground region and a background region; utilizing the image segmenter with the target image to generate a target image segmentation mask having a foreground region and a background region; determining a source image foreground and a source image background of the source image based on the source image segmentation mask; determining a target image foreground and a target image background of the target image based on the target image segmentation mask; removing the target image foreground from the target image; inserting the source image foreground into the target image with the removed target image foreground to create an augmented image having the source image foreground and the target image background; and updating training data of the machine learning model with the augmented image.

According to another embodiment, a system for training a machine learning model comprises: a computer-readable storage medium configured to store computer-executable instructions; and one or more processors configured to execute the computer-executable instructions, the computer-executable instructions comprising: utilizing an image segmenter with a source image to generate a source image segmentation mask having a foreground region and a background region; utilizing the image segmenter with a target image to generate a target image segmentation mask having a foreground region and a background region; determining a source image foreground and a source image background of the source image based on the source image segmentation mask; determining a target image foreground and a target image background of the target image based on the target image segmentation mask; removing the target image foreground from the target image; inserting the source image foreground into the target image with the removed target image foreground to create an augmented image having the source image foreground and the target image background; and updating training data of the machine learning model with the augmented image.

According to another embodiment, a non-transitory computer readable medium comprising a plurality of instructions which, when executed by a processor, cause the processor to: utilize an image segmenter with the source image to generate a source image segmentation mask having a foreground region and a background region; utilize the image segmenter with the target image to generate a target image segmentation mask having a foreground region and a background region; determine a source image foreground and a source image background of the source image based on the source image segmentation mask; determine a target image foreground and a target image background of the target image based on the target image segmentation mask; remove the target image foreground from the target image; insert the source image foreground into the target image with the removed target image foreground to create an augmented image having the source image foreground and the target image background; and update training data of the machine learning model with the augmented image.

DETAILED DESCRIPTION

Figure 1:
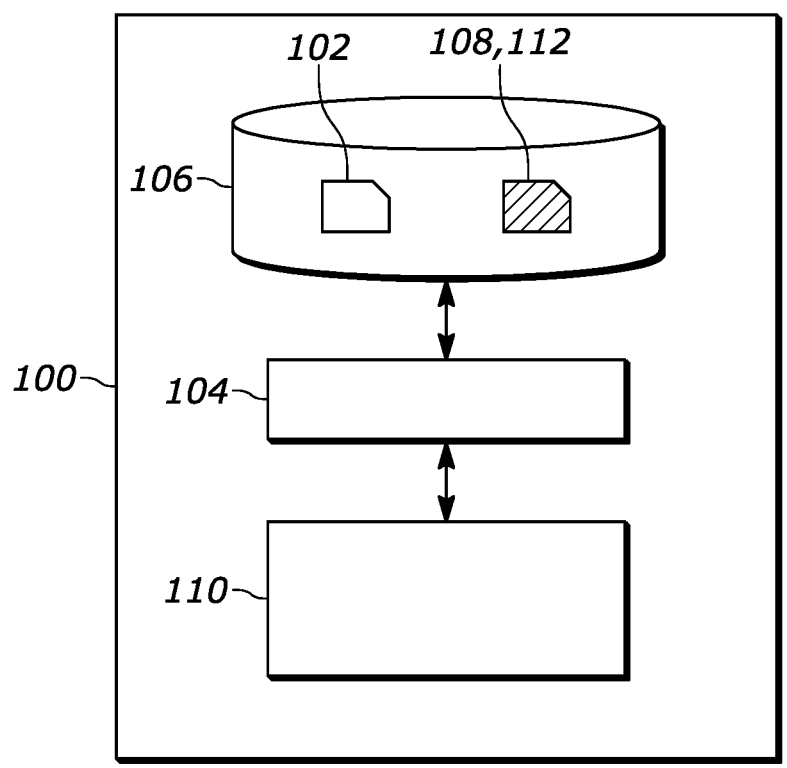
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of this disclosure involve domain generalization, also known as domain shift or domain regularization. In domain generalization, a model F is provided and intended to solve a task where data may come from a variety of domains. For example, F may be an object detection model in an autonomous vehicle that one would like to perform well in a variety of weather conditions, such as sunny, cloudy, rainy, nighttime, etc. The different weather conditions would constitute the different data domains. Model performance will often vary depending on domain, and specifically on the amount of data form each domain in the data set and used to train the model. One task of domain generalization is to maintain model performance in domains that are underrepresented within the training set, or that are not represented at all (e.g., the trained model has never seen these domains before test time).

As will be described more fully below, the training data for the model may include images (e.g., photo, lidar, radar, etc.), wherein the model is trained to determine what a detected object is based on its comparison with the stored training data. In situations where there is not much training data for a particular domain, the accuracy of the model could use improvement. For example, the training data may not have a sufficient number of images regarding a particular type of object, and so corresponding accuracy in the object detection models applied to that type of object may be lagging.

Image augmentation can help create more images for the machine learning model database. Image augmentation involves altering an image training data to create a new image, and storing that new image in the training data to expand the number of stored images in the training database.

CutMix is one type of image augmentation tool. In CutMix, new training images are created by combining images from the original training set. Two images (e.g., a "source" image and a "target" image) are chosen, and a new image (e.g., an "augmented" image) is created. The augmented image is created by selecting a rectangular patch from the source image and pasting it onto the target image. The label of the augmented image is taken to be a weighted mean of the source and target image classes, where the weight is given by the proportion of pixels form the source and target images. For example, if the rectangular patch from the source image is ¼ of the image size, then the label for the augmented imaged will be 0.25 [source image class] and 0.75 [target image class].

In contrast, the invention described according to various embodiments herein involves determining what portions of each image are combined, and how to determine the label of the resulting image. Instead of selecting a random rectangular patch of the source image, the methods and systems described herein uses an image segmenter (image segmentation machine learning model) to divide the pixels in the source image into a foreground region and a background region, and the pixels in the target image into a foreground region and a background region. In other words, the foreground and background of each of the source image and target image is determined. The foreground of the source image is then combined with the background of the target image to create a new augmented image or stitched image to add to the training data for the machine learning model. Unlike CutMix, the region cut from the source image is the foreground of the source image as determined by the image segmenter. This can lead to a more natural-looking augmented image, leading to better performance by the machine learning model relying on the trained data.

The disclosed systems and methods rely on machine learning models, such as neural networks (e.g., deep neural networks (DNN), graphical neural networks (GNN), deep convolutional networks (DCN), convolutional neural networks (CNN), etc.) and the like. FIG. 1 shows a system 100 for training a neural network, e.g., a deep neural network. The neural network or deep neural networks shown and described are merely examples of the types of machine learning networks or neural networks that can be used. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the graphical neural networks and deep neural networks described herein. Additional structure for operating and training the machine learning models is shown in FIG. 2.

Figure 2:
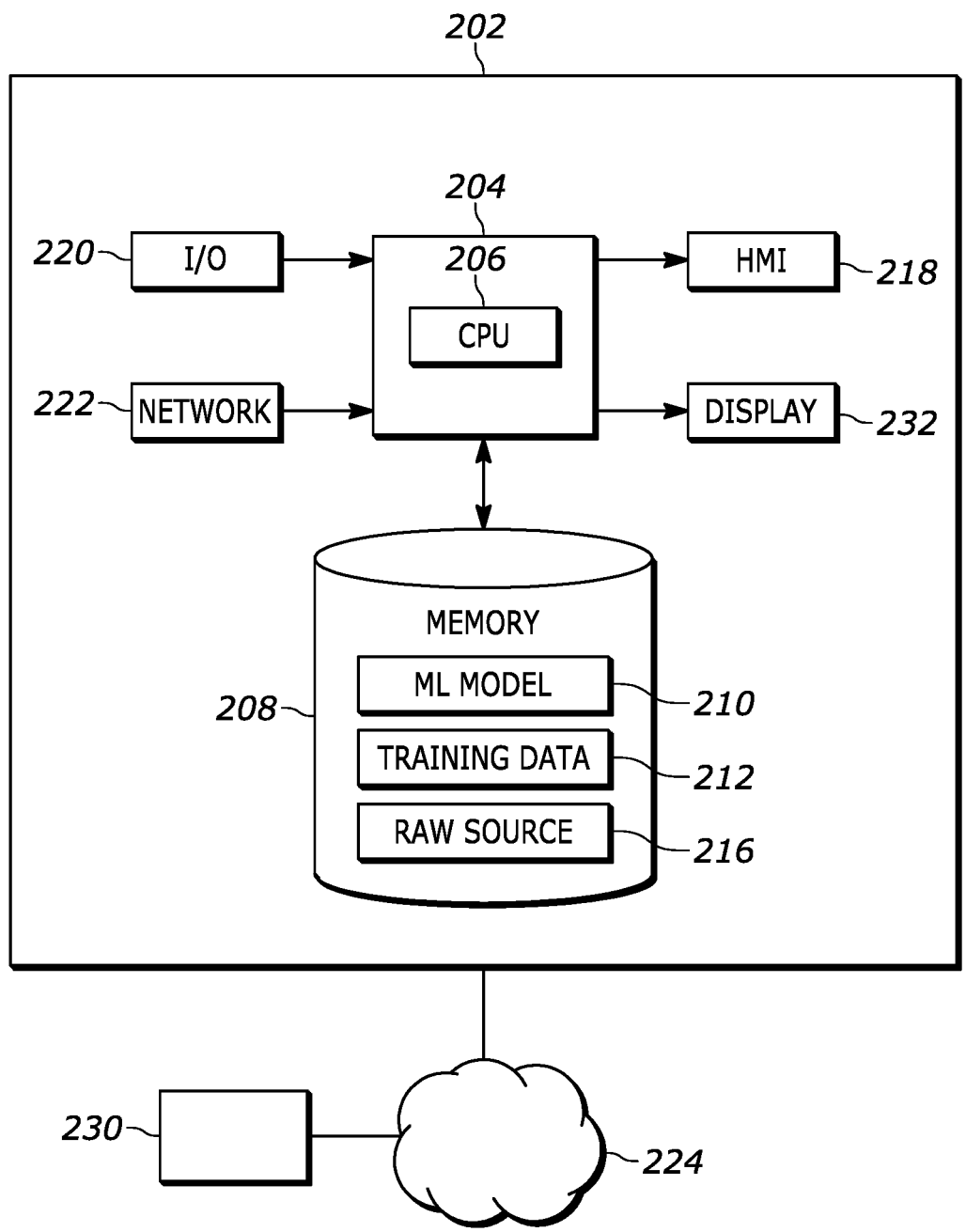
FIG. 2 shows a computer-implemented method for training and utilizing a neural network, according to an embodiment.

FIG. 2 depicts a system 200 to implement the machine learning models described herein, for example the deep neural networks described herein. Other types of machine learning models can be used, and the DNNs described herein are not the only types of machine learning models capable of being used in the system of this disclosure. For example, if the input image contains an ordered sequence of pixels, a CNN may be utilized. The system 200 can be implemented to perform one or more of the phases of image recognition described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine learning model 210 or algorithm, a training dataset 212 for the machine learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device

222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines; timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine learning algorithm 210 that is configured to analyze the raw source dataset 216. The raw source dataset 216 may include raw or unprocessed sensor data that may be representative of an input dataset for a machine learning system. The raw source dataset 216 may include video, video segments, images, text-based information, audio or human speech, time series data (e.g., a pressure sensor signal over time), raw or partially processed sensor data (e.g., radar map of objects). Moreover, the raw source dataset 216 may be input data derived from an associated sensor such as a camera, lidar, radar, ultrasonic sensor, motion sensor, thermal imaging camera, or any other type of sensor that produces associated data with spatial dimensions where there is some notion of a "foreground" and a "background" within those spatial dimensions. References to an input or input "image" herein is not necessarily from a camera, but can be from any of the above-listed sensors. Several different examples of inputs are shown and described with reference to FIGS. 6-12. In some examples, the machine learning algorithm 210 may be a neural network algorithm (e.g., deep neural network) that is designed to perform a predetermined function. For example, the neural network algorithm may be configured to identify defects (e.g., cracks, stresses, bumps, etc.) in a part subsequent to the manufacture of that part but prior to leaving the plant. In another embodiment, the neural network algorithm may be configured in automotive applications to identify obstacles or pedestrians in images, as well as their respective poses, direction of travel, and the like.

The computer system 200 may store a training dataset 212 for the machine learning algorithm 210. The training dataset 212 may represent a set of previously constructed data for training the machine learning algorithm 210. The training dataset 212 may be used by the machine learning algorithm 210 to learn weighting factors associated with a neural network algorithm. The training dataset 212 may include a set of source data that has corresponding outcomes or results that the machine learning algorithm 210 tries to duplicate via the learning process. In one example, the training dataset 212 may include input images that include an object (e.g., a pedestrian). The input images may include various scenarios in which the objects are identified.

The machine learning algorithm 210 may be operated in a learning mode using the training dataset 212 as input. The machine learning algorithm 210 may be executed over a number of iterations using the data from the training dataset 212. With each iteration, the machine learning algorithm 210 may update internal weighting factors based on the achieved results. For example, the machine learning algorithm 210 can compare output results (e.g., a reconstructed or supplemented image, in the case where image data is the input) with those included in the training dataset 212. Since the training dataset 212 includes the expected results, the machine learning algorithm 210 can determine when performance is acceptable. After the machine learning algorithm 210 achieves a predetermined performance level (e.g., 100% agreement with the outcomes associated with the training dataset 212), or convergence, the machine learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine learning algorithm 210 may be applied to new datasets to generate annotated data.

The machine learning algorithm 210 may be configured to identify a particular feature in the raw source data 216. The raw source data 216 may include a plurality of instances or input dataset for which supplementation results are desired. For example, the machine learning algorithm 210 may be configured to identify the presence of a pedestrian in video images and annotate the occurrences. In another example, the machine learning algorithm 210 may be configured to identify the presence of a defect in a manufactured part by capturing images of that part. The machine learning algorithm 210 may be programmed to process the raw source data 216 to identify the presence of the particular features. The machine learning algorithm 210 may be configured to identify a feature in the raw source data 216 as a predetermined feature (e.g., obstacle, pedestrian, road sign, etc.). The raw source data 216 may be derived from a variety of sources. For example, the raw source data 216 may be actual input data collected by a machine learning system. The raw source data 216 may be machine generated for testing the system. As an example, the raw source data 216 may include raw video images from a camera.

Figure 3A:
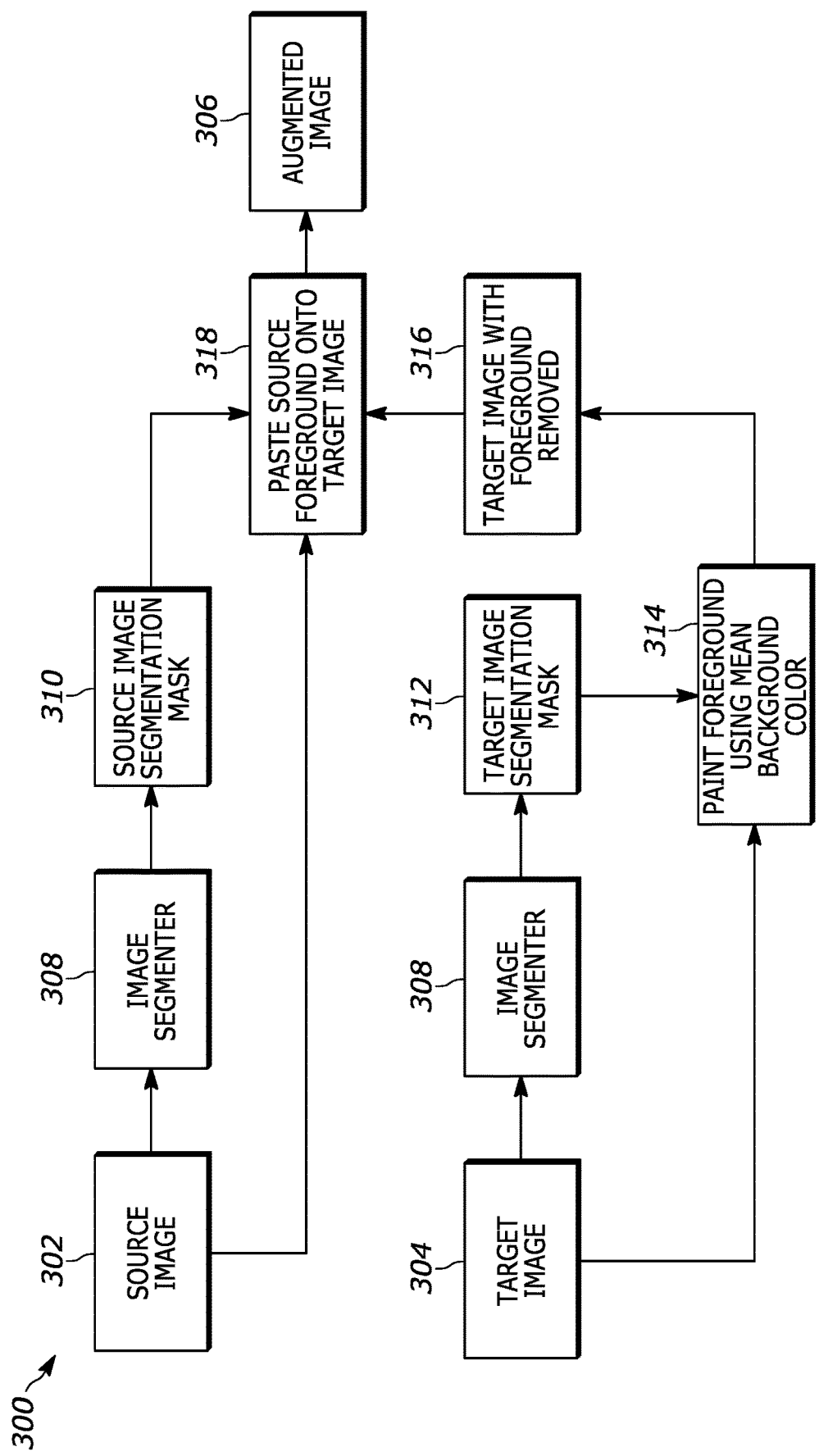
FIG. 3A shows a system flowchart for generating training data for a machine learning model.
Figure 3B:
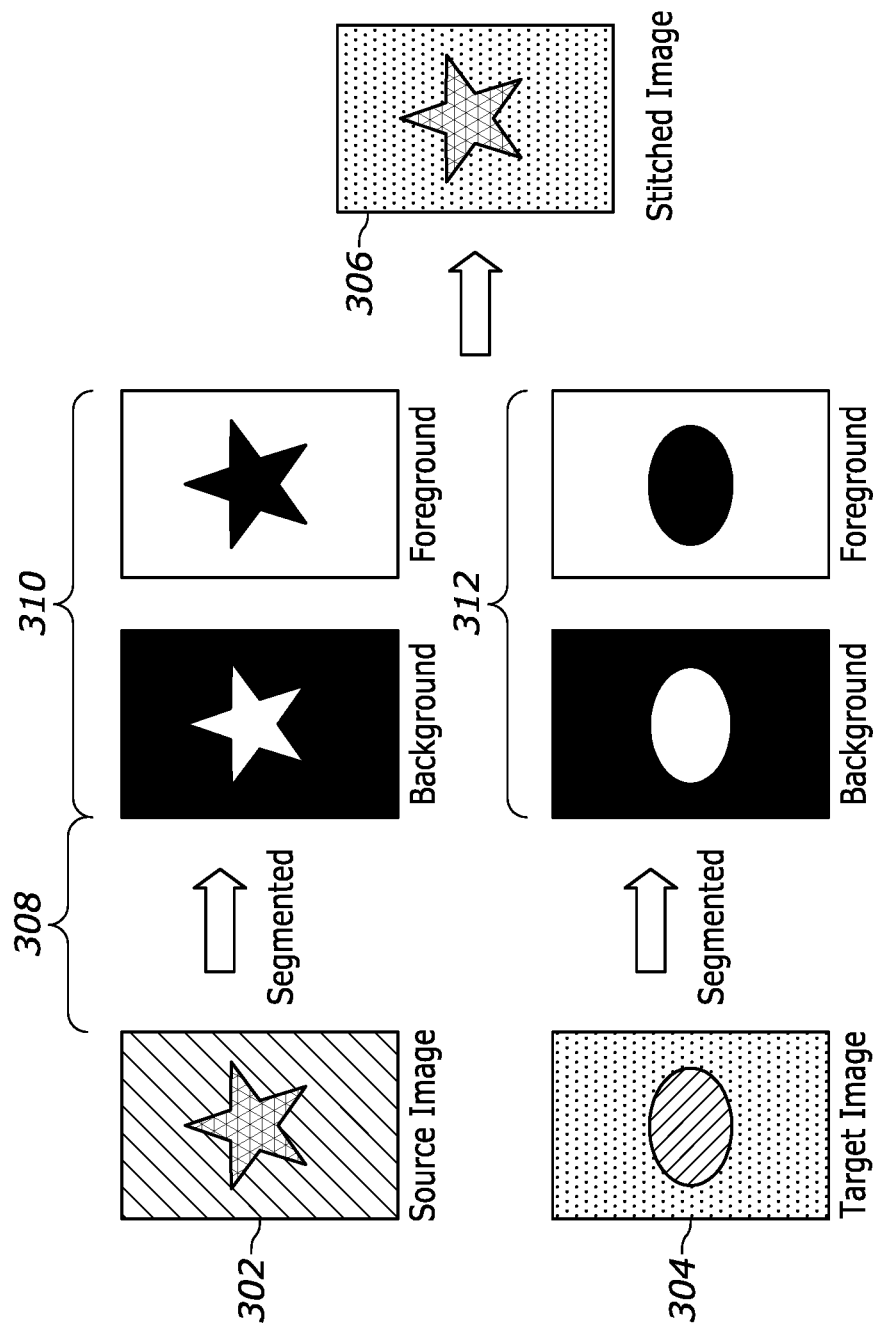
FIG. 3B shows a schematic representation of the generation of training data, according to embodiments.

Given the above description of the machine learning models, along with the structural examples of FIGS. 1-2 configured to carry out the models, FIG. 3 illustrates a flowchart of a system 300 for generating training data for a machine learning model, such as a model described above, and FIG. 3B shows a schematic representation of the generation of training data, according to embodiments. A first image, or source image 302, is received, as well as a second image, or target image 304. The source image 302 and target image 304 may be stored in database 106 or as training data 212, for example. The system 300 works to create an augmented image 306 (or stitched image) from the source image 302 and target image 304. The augmented image 306 can then also be stored in database 106 or in memory 208 as training data 212 for improvement of the machine learning model 210.

The source image 302 and target image 304 are passed through an image segmenter 308. The image segmenter 308 may be performed by one or more processors described herein. The image segmenter 308 is configured to create image segmentation masks corresponding to the source image 302 and target image 304. The image segmenter 308 may be configured to transform the images by converting the detected foreground region into a first color, and the remainder (i.e., the background region) into a second color. The image segmenter 308 may be an image segmentation machine learning model, semantic segmentation model, or the like that is configured to determine a foreground area and a background area of the respective source image 302 and target image 304. In such an embodiment, the image segmenter 308 may rely on a pre-trained machine learning model (e.g., CNN, DCN, etc. such as described above). The model may be trained to, based on colors, shading, orientation, and sizes of objects in the image, determine which objects are in the foreground and which are in the background. The image segmenter need not necessarily be a machine learning model; in other embodiments, the image segmenter 308 may be programmable software configured to alter the pixel color of the source image 302 and target image 304 to create the segmentation masks. For example, the programmable software may be programmed operate with thresholding by converting the pixels of the images at or above a certain brightness threshold to a first color (e.g., white), and converting the pixels of the images below the threshold to a second color (e.g., black), and designating one of the colors as foreground and the other of the colors as background to create the image segmentation masks. In other embodiments, the images themselves contain data representing depth of objects in the image; for example, the image source may be a lidar or radar device which can include depth information for each pixel or location in the produced image. The ultimate determination of foreground and background can be based on this depth information (e.g., objects below a certain depth threshold are foreground, and the remainder is background).

The image segmenter 308 can be the same segmenter, or alternatively, one image segmenter can be used for the source image 302 and another image segmenter can be used for the target image 304.

The output of the image segmenter 308 is an image segmentation mask for each of the source image and the target image 304. In other words, the image segmenter 308 converts the source image 302 into a source image segmentation mask 310, and converts the target image 304 into a target image segmentation mask 312. The source image segmentation mask 310 has a group of pixels converted to a single color representing the foreground of the source image, and another group of pixels converted to another single color representing the background of the source image, as shown in FIG. 3B. Two separate masks may be output, as shown in FIG. 3B, with one showing the pixels in the background in black (e.g., the left image), and another with the pixels in the foreground as black (e.g., the right image). In other embodiments, only one mask is provided, such that the foreground is shaded one color and the background is shaded another color. Taking the example of FIG. 3B, the pixels within the star shape are converted to black and labeled as the foreground, and the remaining pixels outside the star shape are converted to white and labeled as the background. This same process is repeated for the target image 304 utilizing the image segmenter 308 to convert the detected foreground (e.g., the oval shape) to one color, and the pixels outside the remaining pixels outside the oval shape to another color.

At 314, the system is configured to remove the foreground of the target image. The removal of the foreground of the target image may include painting over (inpainting) the region of the target image 304 corresponding to the area determined by the image segmenter 308 to be the foreground. In other words, the pixels of the target image 304 that correspond to the locations of the target image segmentation mask 312 that are colored to represent the foreground are altered. These pixels can be changed in color, whitewashed, darkened, lightened, or the like. In one embodiment, at 314, all of the pixels in the foreground of the target image are painted a color corresponding to the average color of the background pixels. Additional description of this is provided below with respect to the algorithm illustrated in FIG. 12. The resulting image is a target image with the foreground removed, or colored a single color, at 316. In other embodiments, the pixels in the foreground of the target image are shaded a variety of colors corresponding to the colors in the background of the target image.

At 318, the system pastes the source foreground onto the target image at a location where the target image foreground was removed. To do so, the pixels of the target image from 316 at the location where the source image foreground is to be inputted are changed to match the pixel color of the source image foreground. This gives the appearance that the source image foreground has been inserted onto or into the target image background. The result is the augmented image 306. The augmented image 306 can then be stored or saved into memory (e.g., in database 106 or in memory 208 as training data 212 for improvement of the machine learning model 210).

Figure 4:
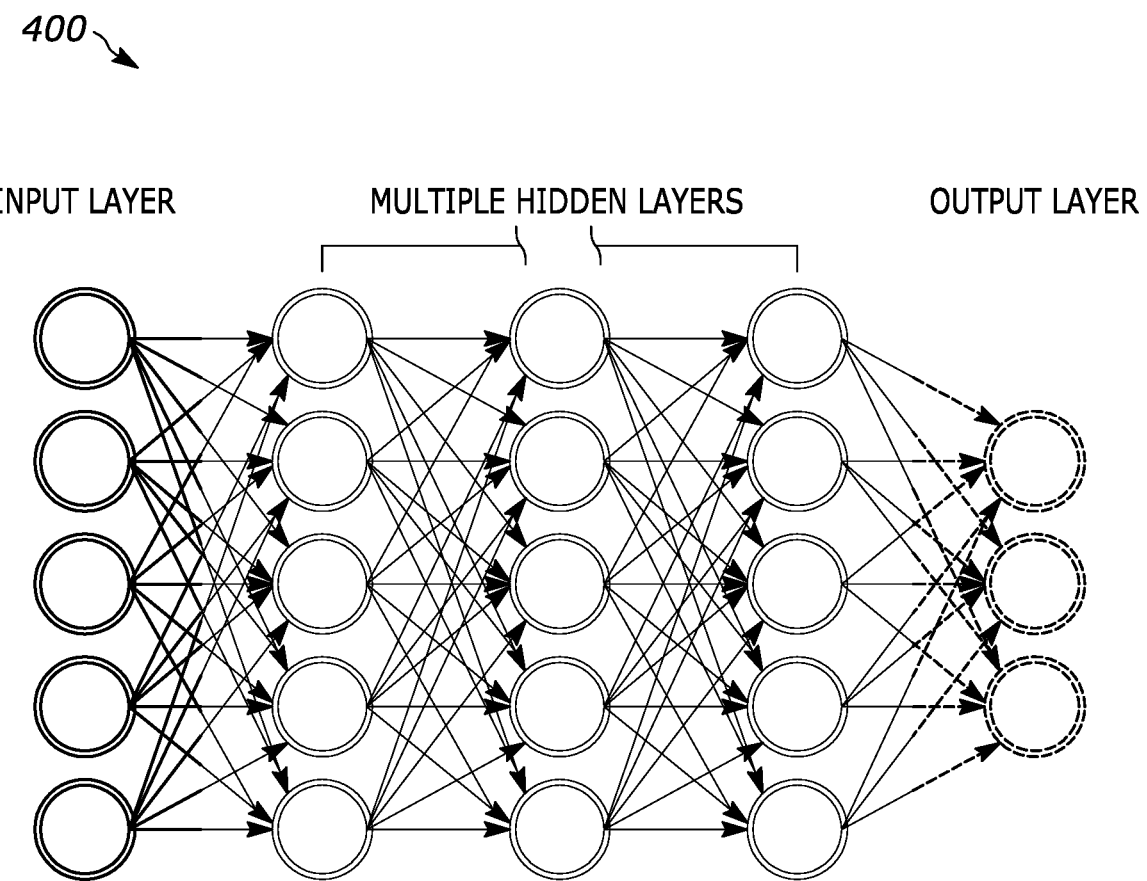
FIG. 4 shows a schematic of a deep neural network with nodes in an input layer, multiple hidden layers, and an output layer, according to an embodiment.

For illustrative purposes, FIG. 4 illustrates an example schematic of a machine learning model 400, such as one performed as an image segmenter, or one utilizing the training data 212 that now includes the augmented images 306. As discussed above, the machine learning model 400 may be a neural network (e.g., and in some cases, while not required, a deep neural network). If the machine learning model 400 is used as an image segmenter, the machine learning model 400 may be configured as a data-oriented image processing model that uses a data-oriented approach to determine a new color of each pixel of the target image. If the machine learning model 400 is used as an objectdetecting model (e.g., determining the presence of a defect in a part, determining the presence of objects outside a vehicle, etc.), the machine learning model may be configured accordingly. The machine learning model 400 can include an input layer (having a plurality of input nodes) and an output layer (having a plurality of output nodes). In some examples, machine learning model 400 may include a plurality of hidden layers. The nodes of the input layer, output layer, and hidden layers may be coupled to nodes of subsequent or previous layers. And each of the nodes of the output layer may execute an activation function—e.g., a function that contributes to whether the respective nodes should be activated to provide an output of the machine learning model 400. The quantities of nodes shown in the input, hidden, and output layers are merely exemplary and any suitable quantities may be used.

As described above, the machine learning models described herein can be used in many different applications where data augmentation for domain generalization may be beneficial to the model, such as pedestrian or road sign detection for a vehicle, part-defect detection in a manufacturing plant, and the like. In the example of a part-defect detection, for example, the machine learning model with updated augmented training data may be better equipped to determine if a defect is present in the part by comparing an image of that part (e.g., taken from an image sensor such as a camera, lidar, radar, thermal sensor, or the like as explained herein) to the trained data, and binning the part based on the detected image. Binning the part may include marking, sorting, changing the flow of direction in the assembly line, laser trimming, and other methods of marking or separating the part from the parts without defends.

Figure 5:
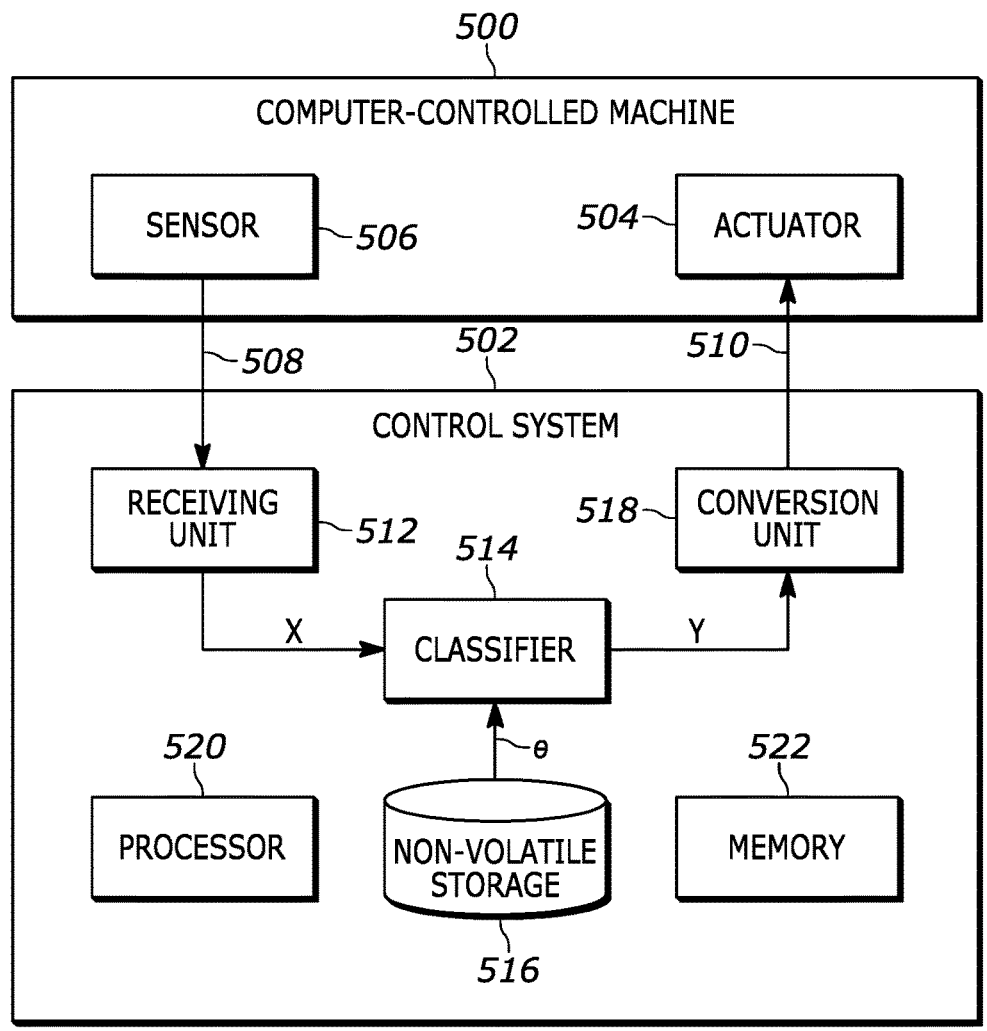
FIG. 5 depicts a schematic diagram of an interaction between a computer-controlled machine and a control system, according to an embodiment.

Additional applications data augmentation for domain generalization may be used are shown in FIGS. 6-11. In these embodiments, additional training data produced by the augmented image and stored for use by the model ultimately improves the performance of the model. Structure used for training and using the machine learning models for these applications (and other applications) are exemplified in FIG. 5. FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors, as described above with reference to FIGS. 1-2. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine learning (ML) algorithm, such as a neural network described above. Classifier 514 is configured to be parametrized by parameters, such as those described above (e.g., parameter $\theta$). Parameters $\theta$ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
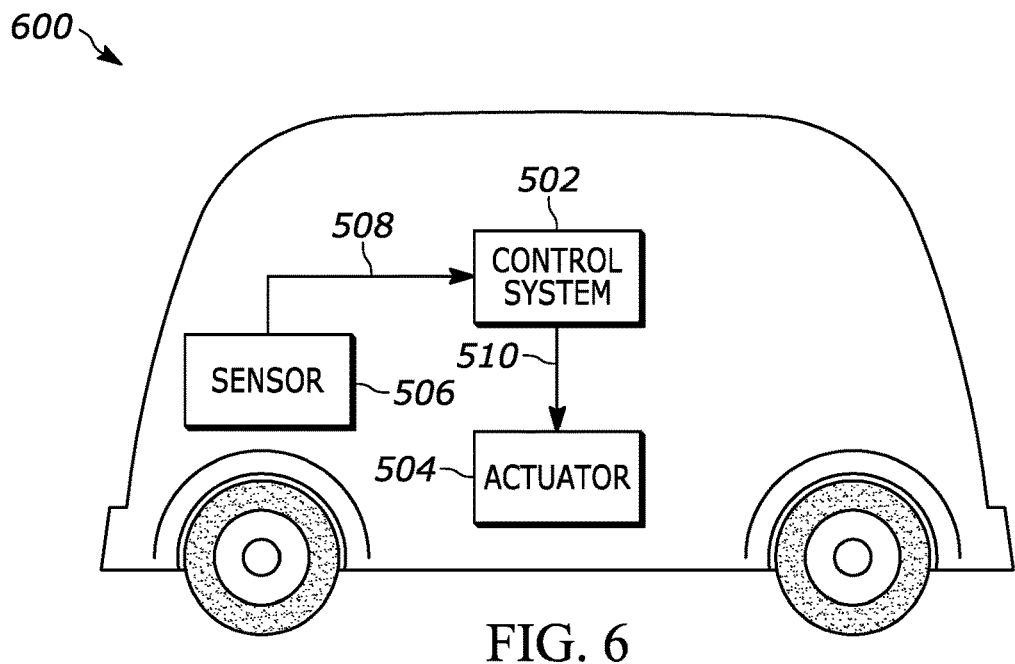
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
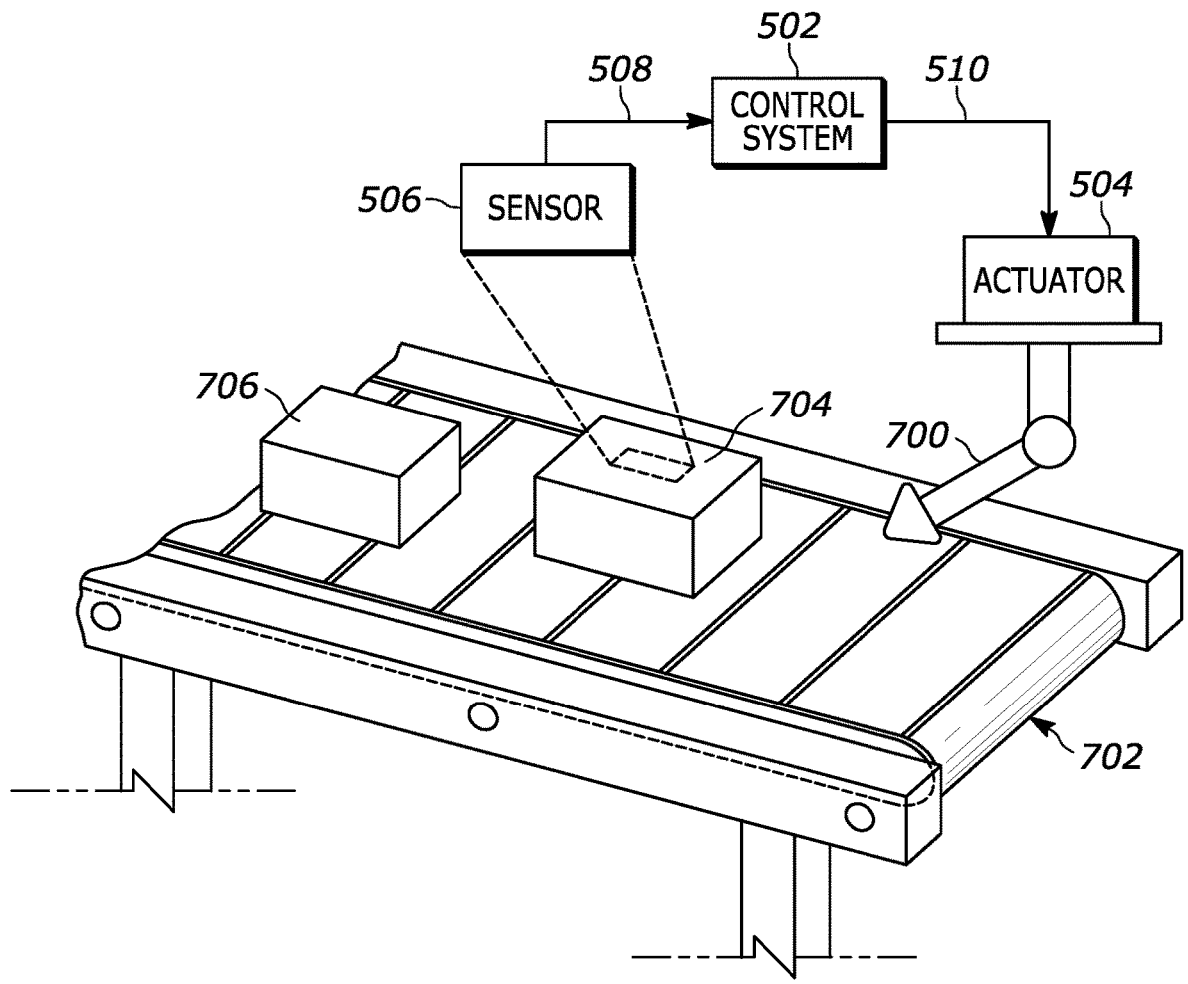
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor (such as those described above) configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704, or for binning the manufactured product 704 (e.g., discard, sorting, marking, trimming, or repair) if the manufactured product 704 has a detected defect. The actuator 504 may be configured to control functions of system 700 (e.g., manufacturing machine) on subsequent manufactured product 706 of system 700 (e.g., manufacturing machine) depending on the determined state of manufactured product 704.

Figure 8:
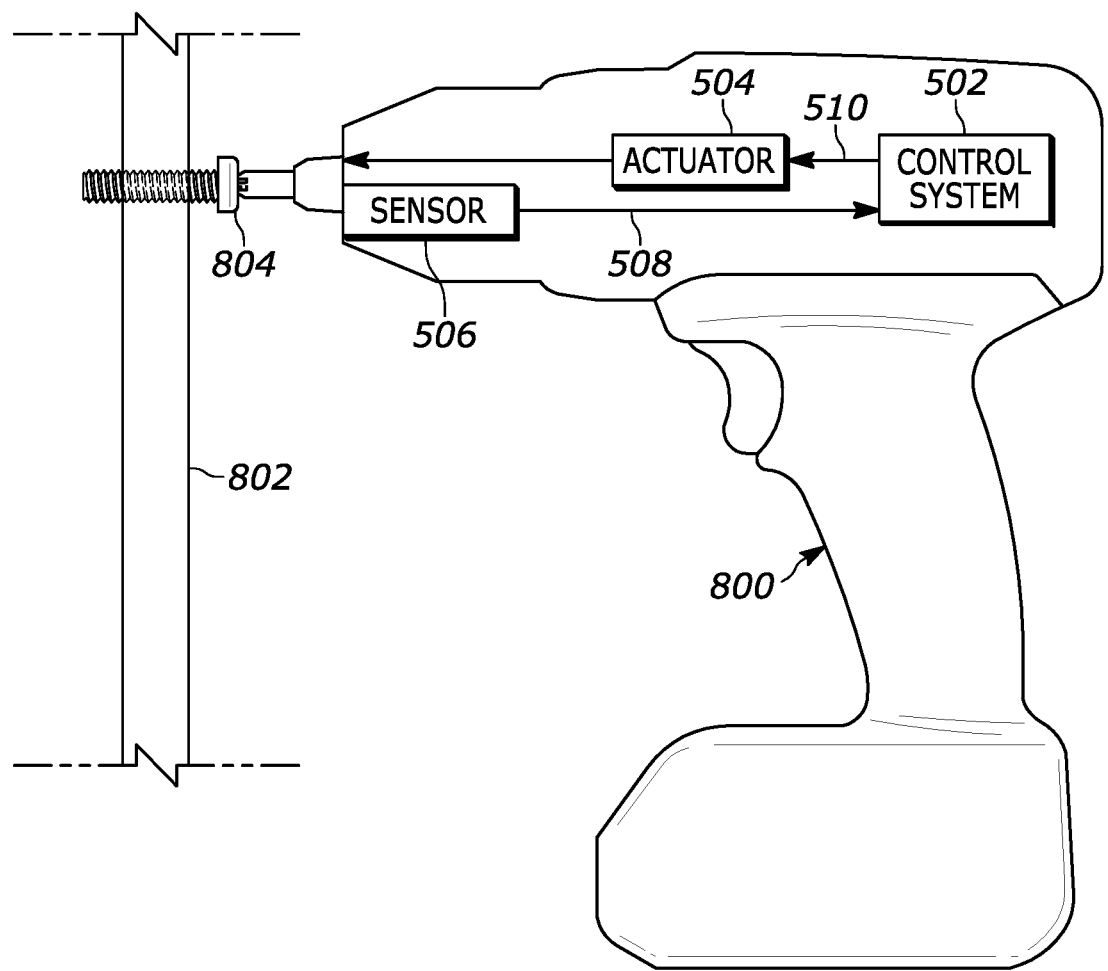
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
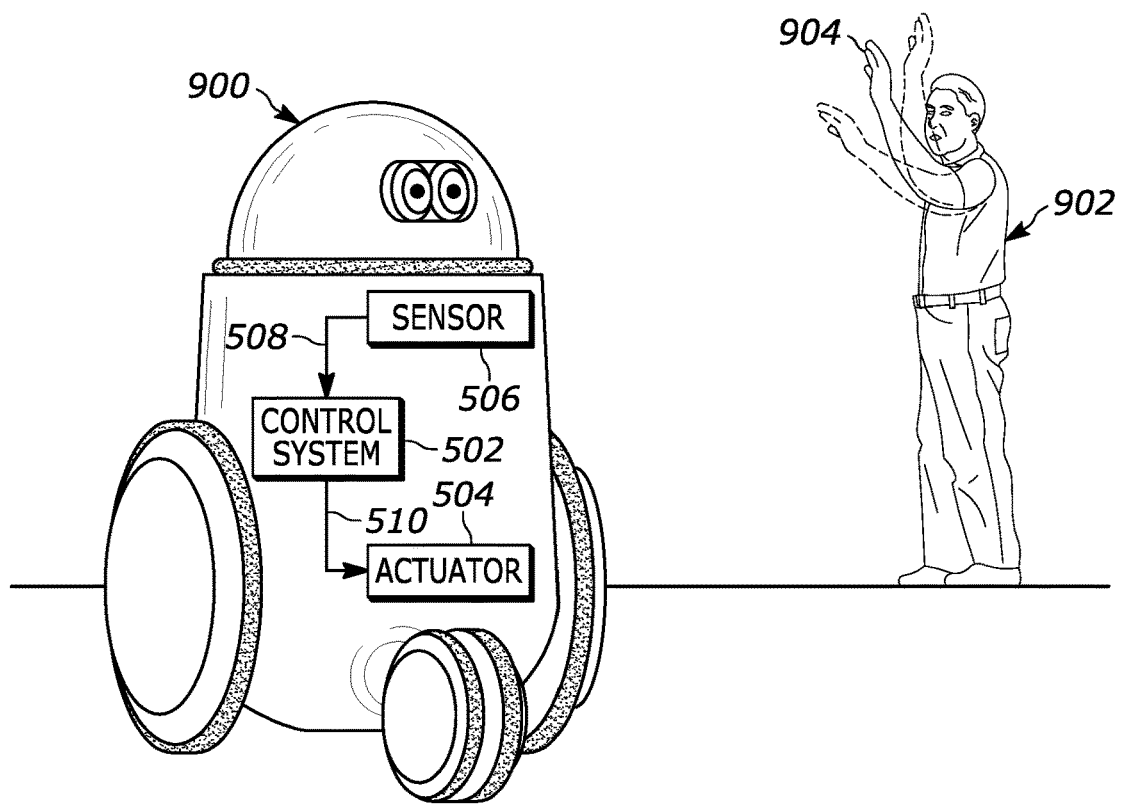
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
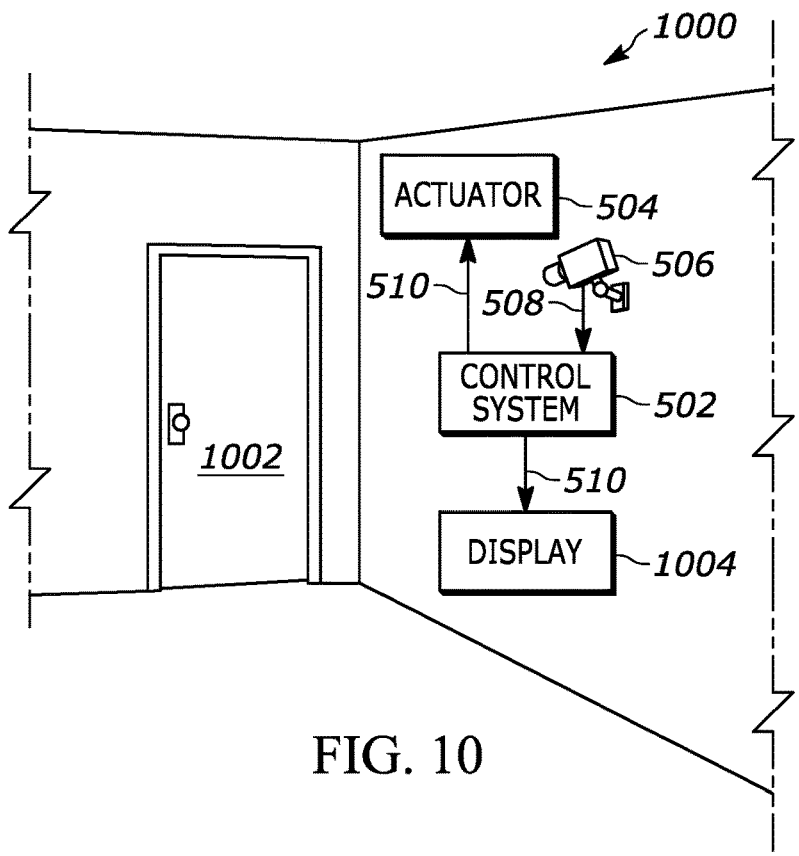
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
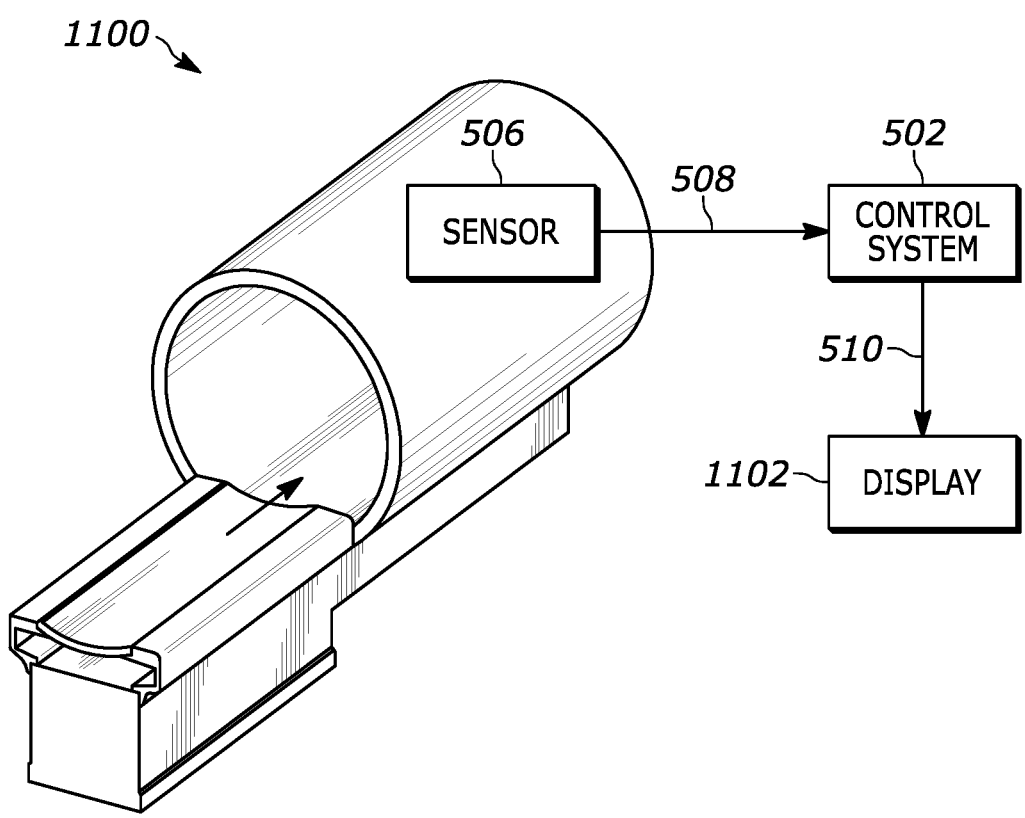
FIG. 11 depicts a schematic diagram of the control system of FIG. 5 configured to control an imaging system, for example an MM apparatus, x-ray imaging apparatus or ultrasonic apparatus.

FIG. 11 depicts a schematic diagram of control system 502 configured to control imaging system 1100, for example an Mill apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

The processor(s) described herein may be configured to perform an algorithm for generating training data for the machine learning model. One embodiment of the algorithm will now be described. In the description below, superscripts are used to denote different images, and subscripts are used to denote pixels within an image, so $x^i$ is an image and $x_{a,b}^i$ is the pixel in image $x^i$ at location (a,b).

The algorithm can receive a plurality of inputs, such as:
Dataset $D = \{(x^1, y_1), \ldots, (x^n, y_n)\}$ of image-label pairs, with image $x^i \in [0,1]^{w \times H \times 3}$ and $y_i \in \{1, \ldots, K\}$ Data domains $D_1, \ldots, D_m$, where each image-label pair in the dataset belongs to exactly one domain An image segmentation model or method (such as image segmenter 308), such as G: $\mathbb{R}^{W \times H \times 3} \to \{0,1\}^{W \times H}$, which predicts whether each pixel will be in the foreground (which corresponds to pixels with segmenter output equal to 1) or background (segmenter output 0)

A number of stitched or augmented images to create N

The output or return of the algorithm is an augmented dataset D*.

The algorithm performs as follows, according to an embodiment. The processor may initialize an augmented data set D*:={ }. Then, for i=1, N, the following steps may occur. First, the processor selects a source domain $D_s$ and a target domain $D_t$, where $D_s \neq D_t$.

It should be noted that there are many ways to choose the source and target domains. For example, the algorithm could sample the set of domains with some probability. In this case, since it is desired to improve performance on domains that are underrepresented in the training set, the algorithm could be configured with probabilities such that the probability of selecting a data domain decreases as the number of images in the domain increases.

In selecting the source image, the processor can select a source image-label pair $(x^s, y^s) \in D_s$, where x and y are pixel Likewise, in selecting the target image, the processor may select a target image-label pair $(x^t, y^t) \in D_t$.

Then, the source image and target image are passed through the image segmenter to generate segmentation masks $z_s := G(x^s)$ and $z^t := G(x^t)$.

Then the foreground of the target image is removed by inpainting using the mean color of the target image background. This can be accomplished as follows. First, the processor(s) determines the mean color c of the pixels in the background of the target image, i.e., all pixel locations (a,b) where the target mask pixel $z_{a,b}^t = 0$. Then, the processor(s) assigns $x_{a,b}^t \leftarrow c$ for all pixel locations (a,b) where the target mask pixel $z_{a,b}^t = 1$.

In this step, the algorithm essentially "paints over" the foreground by replacing foreground pixels with the mean color in the background. Other methods of removing the foreground of the target could be used; for example, there are many deep learning methods for inpainting or inferring missing pixels that could be used instead.

Once the foreground of the target image is removed, the source foreground can be pasted onto the target image. To do so, the processor(s) assigns $x_{a,b}^t \leftarrow x_{a,b}^s$ for all pixel locations (a,b) where the source mask pixel $z_{a,b}^s = 1$.

The processor(s) adds the augmented image with the source image label $(x^t, y^s)$ to the augmented dataset D*. In other words, the augmented image can be labeled with the same label as the source image.

Training of the machine learning model can then proceed using the union of the original training set and the augmented dataset $D \cup D^*$.

It should be noted that this algorithm assumes that the images in the dataset are all of uniform size. If they are not, then the step of pasting the source foreground onto the target image can be modified to first reshape the source image to the dimensions of the target image, and then paste it onto the target image.

Figure 12:
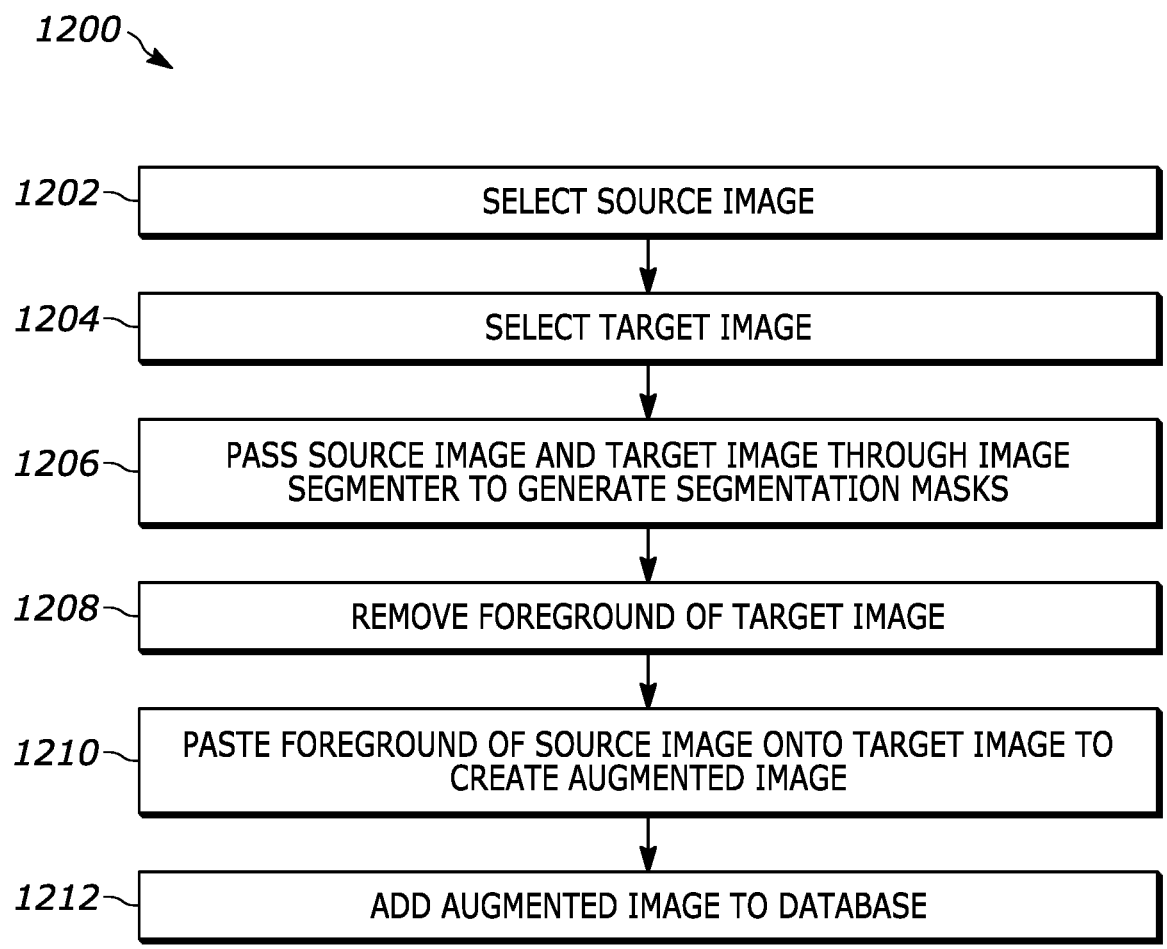
FIG. 12 is flowchart of an algorithm for generating training data for a machine learning model and updating the database for the machine learning model, according to an embodiment.

FIG. 12 illustrates a method 1200 for generating training data for the machine learning model according to the embodiments described herein. The method is a summary of the algorithm described above. The method 1200 can be performed by the one or more processors and associated memory described herein, and can be used in conjunction with the teachings herein regarding generating training data, such as shown in FIGS. 1-4 and described above with respect to one embodiment of an algorithm.

At 1202, the processor selects a source image 302, and at 1204, the processor selects a target image 304. The selection of these images may be based on a need to improve the database of a class of objects. In other words, since it may be desired to improve performance on domains that are underrepresented in the training set, probabilities can be utilized in steps 1202 and 1204 such that the probability of selecting a data domain decreases as the number of images in the domain increases. For example, if the machine learning system is in need of more training for a particular type of road sign, the processor may select the source image 302 as having this road sign in the foreground. Alternatively, these steps may be performed manually.

At 1206, the source image 302 and target image 304 are passed through an image segmenter (such as image segmenter 308 described above) to generate segmentation masks. Referring to the algorithm described above, masks $z_s := G(x^s)$ and $z^t := G(x^t)$ are generated by the segmenter such that some pixels are converted to 0 and the remainder are converted to 1.

At 1208, the foreground of the target image 304 is removed. This can be performed according to the teachings herein, such as inpainting using the mean color of the target image background, or other methods.

At 1210, the foreground of the source image is painted onto the target image. Again, according to one embodiment, pixel colors in the target image are changed according to $x_{a,b}^t \leftarrow x_{a,b}^s$ for all pixel locations (a,b) where the source mask pixel $z_{a,b}^s = 1$. This produces an augmented image.

At 1212, the augmented image is added to the training data or dataset for training the machine learning model.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for performing at least one task with autonomous control of a part, the system comprising:
   an image sensor configured to output an image of the part;
   an actuator configured to bin the part based on a detected defect in the part;
   a processor; and memory including instructions that, when executed by the processor, cause the processor to:
  utilize an image segmenter on a source image stored in the memory to generate a source image segmentation mask having a foreground region and a background region;
  utilize the image segmenter on a target image stored in the memory to generate a target image segmentation mask having a foreground region and a background region;
  determine a source image foreground and a source image background of the source image based on the source image segmentation mask;
  determine a target image foreground and a target image background of the target image based on the target image segmentation mask;
  remove the target image foreground from the target image;
  insert the source image foreground into the target image with the removed target image foreground to create an augmented image having the source image foreground and the target image background;
  update training data of the machine learning model with the augmented image;
  utilize the machine learning model with the updated training data to determine a defect in the part; and
  actuate the actuator to bin the part based on the determined defect in the part.

2. The system of claim 1, wherein the instructions, when executed by the processor, cause the processor to remove the target image foreground from the target image background by:
  determining an average color of pixels in the target image background; and
  changing the pixels in the target image foreground to assume the average color.

3. A computer-implemented method for generating training data for a machine learning model, the computer-implemented method comprising:
  selecting a source image from an image database;
  selecting a target image from the image database;
  utilizing an image segmenter with the source image to generate a source image segmentation mask having a foreground region and a background region;
  utilizing the image segmenter with the target image to generate a target image segmentation mask having a foreground region and a background region;
  determining a source image foreground and a source image background of the source image based on the source image segmentation mask;
  determining a target image foreground and a target image background of the target image based on the target image segmentation mask;
  removing the target image foreground from the target image;
  inserting the source image foreground into the target image with the removed target image foreground to create an augmented image having the source image foreground and the target image background; and
  updating training data of the machine learning model with the augmented image.

4. The computer-implemented method of claim 3, wherein the step of removing includes:
  changing colors of at least a group of pixels in the target image foreground.

5. The computer-implemented method of claim 3, wherein the step of removing includes:
  determining an average color of pixels in the target image background; and
  changing the pixels in the target image foreground to assume the average color.

6. The computer-implemented method of claim 3, further comprising:
  determining a color of a pixels in the source image at a location corresponding to the source image foreground; and
  wherein the step of inserting includes assigning the color to pixels in the target image at a location corresponding to the target image foreground.

7. The computer-implemented method of claim 3, wherein:
  the source image segmentation mask and the target image segmentation mask are generated with a first color in the respective foreground regions and a second color in the respective background regions.

8. The computer-implemented method of claim 3, further comprising outputting a trained machine learning model based on the updated training data.

9. The computer-implemented method of claim 8, further comprising:
  receiving an input image of a part from an image sensor;
  using the trained machine learning model and the input image to determine a defect is present in the part; and
  binning the part based on the determined defect in the part.

10. The computer-implemented method of claim 3, wherein the source image is part of a group of source images having a common domain, and wherein the step of selecting the source image is based on a probability such that the probability of selecting a given source image decreases as the number of images with the common domain increases.

11. The computer-implemented method of claim 3, wherein the image segmenter is an image segmentation machine learning model.

12. A system for training a machine learning model, the system comprising:
  a computer-readable storage medium configured to store computer-executable instructions; and
  one or more processors configured to execute the computer-executable instructions, the computer-executable instructions comprising:
    utilizing an image segmenter with a source image to generate a source image segmentation mask having a foreground region and a background region;
    utilizing the image segmenter with a target image to generate a target image segmentation mask having a foreground region and a background region;
    determining a source image foreground and a source image background of the source image based on the source image segmentation mask;
    determining a target image foreground and a target image background of the target image based on the target image segmentation mask;
    removing the target image foreground from the target image;
    inserting the source image foreground into the target image with the removed target image foreground to create an augmented image having the source image foreground and the target image background; and
    updating training data of the machine learning model with the augmented image.

13. The system of claim 12, wherein the step of removing includes:

changing colors of at least a group of pixels in the target image foreground.

14. The system of claim 12, wherein the step of removing includes:
 determining an average color of pixels in the target image background; and
 changing the pixels in the target image foreground to assume the average color.

15. The system of claim 12, wherein the computer-executable instructions further comprise:
 determining a color of a pixels in the source image at a location corresponding to the source image foreground; and
 wherein the step of inserting includes assigning the color to pixels in the target image at a location corresponding to the target image foreground.

16. The system of claim 12, wherein:
 the source image segmentation mask and the target image segmentation mask are generated with a first color in the respective foreground regions and a second color in the respective background regions.

17. The system of claim 12, wherein the computer-executable instructions further comprise:
 outputting a trained machine learning model based on the updated training data.

18. The system of claim 17, wherein the computer-executable instructions further comprise:
 receiving an input image of a part from an image source;
 using the trained machine learning model and the input image to determine a defect is present in the part; and
 outputting a message indicating the presence of the defect in the part.

19. The system of claim 12, wherein the source image is part of a group of source images having a common domain, and wherein the step of selecting the source image is based on a probability such that the probability of selecting a given source image decreases as the number of images with the common domain increases.

20. The system of claim 12, wherein the image segmenter is an image segmentation machine learning model.

* * * * *